(12) United States Patent
Kulli et al.

(10) Patent No.: US 9,996,437 B2
(45) Date of Patent: Jun. 12, 2018

(54) FAILOVER IN A SAN ENVIRONMENT

(71) Applicant: EMC Corporation, Hopkinton, MA (US)

(72) Inventors: Prashant Kulli, Bangalore (IN); Praveen Satya, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days. days.

(21) Appl. No.: 15/084,559

(22) Filed: Mar. 30, 2016

(65) Prior Publication Data
US 2016/0292056 A1 Oct. 6, 2016

(51) Int. Cl.
G06F 11/00 (2006.01)
G06F 11/20 (2006.01)
G06F 11/07 (2006.01)
G06F 11/34 (2006.01)

(52) U.S. Cl.
CPC ...... *G06F 11/2094* (2013.01); *G06F 11/0793* (2013.01); *G06F 11/3485* (2013.01); *G06F 2201/805* (2013.01)

(58) Field of Classification Search
CPC ............. G06F 11/0727; G06F 11/0793; G06F 11/3409; G06F 11/3485; G06F 11/349
See application file for complete search history.

(56) References Cited

U.S. PATENT DOCUMENTS

| 7,409,586 B1* | 8/2008 | Bezbaruah | G06F 11/0727 714/13 |
| 8,074,101 B1* | 12/2011 | Vohra | G06F 11/004 714/4.1 |
| 9,647,933 B1* | 5/2017 | Tawri | H04L 45/28 |
| 2002/0188711 A1* | 12/2002 | Meyer | G06F 3/0605 709/223 |
| 2005/0010843 A1* | 1/2005 | Iwamitsu | G06F 11/0727 714/724 |
| 2010/0161852 A1* | 6/2010 | Veni | G06F 11/0727 710/38 |

* cited by examiner

Primary Examiner — Charles Ehne
(74) Attorney, Agent, or Firm — Krishnendu Gupta; Robert Kevin Perkins

(57) ABSTRACT

A method, system, and computer program product for managing performance of an application I/O comprising determining paths from a first host to a node in a cluster that are flaky; and initiating a failover mechanism for the application I/O from the node in the cluster to a second node in the cluster ensuring seamless execution of the application I/O in the cluster.

21 Claims, 6 Drawing Sheets

FAILOVER IN A SAN ENVIRONMENT

RELATED APPLICATION

This application claim priority from Indian Patent Application Number 1695/CHE/2015 filed on Mar. 31, 2015 titled "FAILOVER IN A SAN ENVIRONMENT" filed at the Office of the Controller General of Patents, Trademarks and Geographical Indicators at Chennai, India, the contents of which are herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure generally relates to storage systems.

BACKGROUND

Conventionally, SAN environment may comprise a plurality of hosts, a fabric and an array (data storage subsystems), and there may be multiple physical paths or buses, to each data storage subsystem. These paths may be typically managed by a multipath software or multipath application, which may form a part of a SAN environment.

PowerPath conventionally is a host-based software for data path management, recovery and optimized load balancing. A host-based software, such as PowerPath, may typically automate, standardize and optimize data paths in a virtual setting, a physical setting and/or a cloud settings to deliver peak availability and performance. A host-based software, such as PowerPath, may allow users to meet lofty service levels with efficient application performance, and may be available for a number of operating systems.

SUMMARY

Example embodiments of the disclosure relate to a method, system, and computer program product for managing performance of an application that may include determining that paths from a first host to a node in a cluster may be flaky; and initiating a failover mechanism for application I/O from the node in the cluster to a second node in the cluster to ensure seamless execution of the application in the cluster.

BRIEF DESCRIPTION OF THE DRAWINGS

Objects, features, and advantages of embodiments disclosed herein may be better understood by referring to the following description in conjunction with the accompanying drawings. The drawings may not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Figure 1:
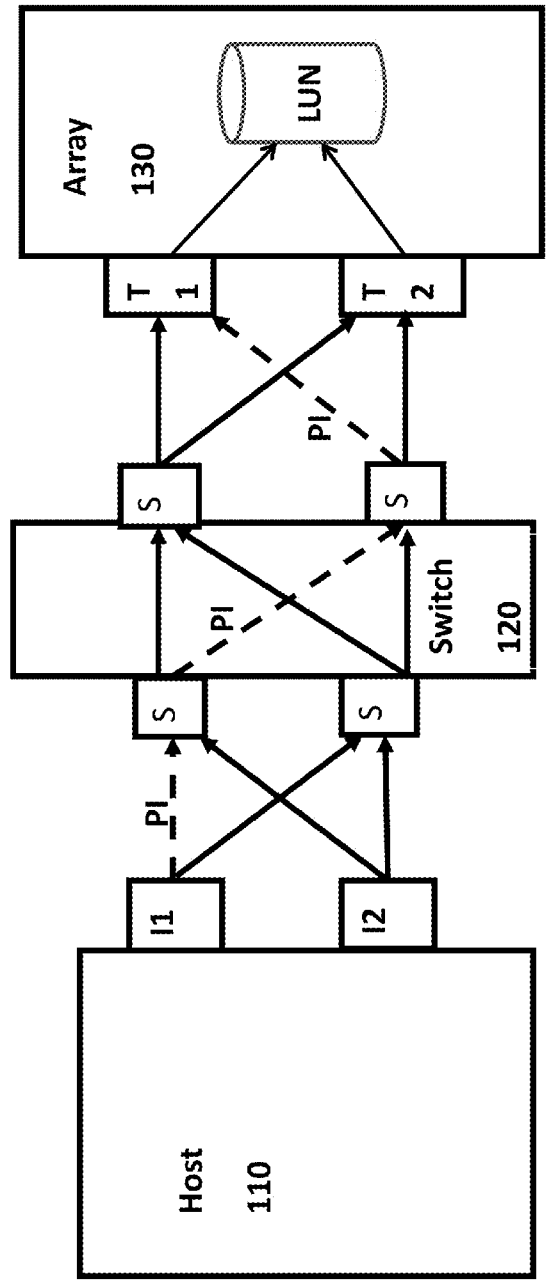
FIG. 1 is an exemplary architecture of a multipath deployment in a SAN environment 100 in accordance with an embodiment of present disclosure.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

DETAILED DESCRIPTION

Exemplary embodiments of the present disclosure relate to a data storage, and more specifically to detection of flaky path based and failover in a SAN (hereinafter may also be referred to as a cluster) environment. Exemplary embodiments of the present disclosure will be described with reference to the accompanying drawings. Although some exemplary embodiments of the present disclosure have been displayed in the accompanying drawings, it should be understood that the present disclosure may be implemented in various other forms, and should not be strictly limited to the exemplary embodiments described herein. On the contrary, these exemplary embodiments are provided to make the present disclosure understood more thoroughly and completely by means of the illustrations. It should be understood that the accompanying drawings and exemplary embodiments of the present disclosure are merely for illustration, rather than being read as a limitation on the scope of the present disclosure.

Generally speaking, all terms used herein should be understood according to their general meanings in the art unless otherwise explicitly stated. Mentioned "a/an/the/said element, device, component, apparatus, unit, step, etc." should be construed as at least one instance of the above element, device, component, apparatus, unit, step, etc., and is not excluded to comprise a plurality of such elements, devices, components, apparatuses, units, steps, etc., unless otherwise explicitly stated.

Generally, in some embodiments, within a SAN environment or a cluster environment, it may be important to identify data path failures. In some other embodiments, alternative paths may be identified and provided to enable execution of applications without impacting system performance. In some other embodiments, data centers may deploy clustering technology (such as tools/applications) to identify and provide redundancy in data paths. In such embodiments, on identifying failures in a data path through one node (hereinafter also referred to as a host or a virtual machine) in a cluster, another node may be used to reroute application data. In some other embodiments, another node or other nodes in a cluster may be configured to take over quickly (having a high response time) providing high availability for an application when a first node has failed.

In certain embodiments, multipathing solutions/applications may be configured to mark a path as flaky in a cluster environment (SAN environment). In certain other embodiments, a flaky path may be a path that generally transmits data with an unacceptable amount of errors in that path. In certain other embodiments, a user or an application may determine or define a quantum of unacceptable errors in a path within a cluster environment. In some embodiments, a f1 key path or path that has an unacceptable quantum of errors may require data to be resent via other paths in order to correct any errors during transmission of the data. In some embodiments, a multipath application (multipath software) ay not be configured to make effective use of other available paths in the cluster, which may be in a good condition. In some other embodiments, where flaky paths may exist, multipath applications may use flaky paths absence the identification of flaky paths and rerouting via other paths, and may therefore not result in maximizing system performance.

In some embodiments, multipath applications may make use of paths identified as flaky running through a node or may continue to use other paths that run through that node. In an embodiment, when a number of paths have been identified as flaky, this may be an indication that there may be a hardware or software error for that node. In certain embodiments, a failover mechanism may be provided in a cluster to enable high availability of nodes in the cluster. In other embodiments, high availability may be provided in a virtual environment by intimating a cluster service application in a cluster. In other embodiments, high availability may be enabled in a virtual environment application (service) where paths leading to resources (LUNs) through a current node may be identified to be flaky. In some embodiments, on determination that a number of paths in a cluster are flaky, a cluster may failover resources to another node of the same cluster.

In certain embodiments, multipath applications may be enabled to failover a path or node when a path or a node may be determined to be flaky. In some embodiments, multipathing multipath applications may be enabled to failover a node in a cluster when some or all paths of a node may be determined to be flaky in a cluster. In certain embodiments, multipath applications may be able to detect flakiness in a cluster/SAN. In many embodiments, a flaky path to LUNs in a cluster may be put in a standby mode. In further embodiments, if paths to target devices (such as an array) from a particular node are found to be flaky, a failover indicator may be generated. In some embodiments, when all paths between a node and a target device are found to be flaky, that node may be failed over to another node such that applications using that node may not be affected with performance related issues.

Generally, in some embodiments, as high availability may be an important factor in storage and networking industry, there may be a number of methods/techniques devised to identify failures in data paths and provide failovers when such failures occur. Conventionally, most data centers may deploy clustering technology (also referred to as clustering software or cluster management application or cluster services applications) through which redundancy in data paths may be provided. Generally, in an event a data path through one node fails, a cluster service application may initiate another node and/or other nodes in a cluster to take over a failed node thereby providing high availability to an application.

Example embodiments of the present disclosure may include a system, a computer program product a method for managing performance of an application (application I/O) associated with a node (hereinafter also referred to as a host or a virtual machine) in a cluster (hereinafter also referred to as a Storage Area Network (SAN)). In a further embodiment a SAN may include at least one switch and at least one array in addition to a node. In a further embodiment an array may include a plurality of logical unit numbers (LUNs). A further embodiment may include determination or identification of a trigger in a multipath application, wherein a trigger may be configured to indicate to a service running in a cluster that paths from a first node in a cluster (a cluster can be a host or a node or an I/O domain (virtual machine) may be flaky. In a further embodiment, a service (cluster service application or virtualization application/technology or cluster service) may be configured to initiate a failover from a first node to a second node in a cluster. In a further embodiment a cluster may comprise a plurality of nodes. In yet a further embodiment a failover mechanism from a failed first node to another node in a cluster may ensure seamless execution of an application without impacting any application related performance.

In a further embodiment of the present disclosure, each node may include a plurality of host bus adapters (HBA). In yet a further embodiment, a fabric may include a plurality of switches. In a further embodiment, a fabric may include a plurality of ports (referred to as switch ports). In yet a further embodiment, an array (Storage or LUN) may include a plurality of ports (referred to as array ports).

In a further embodiment, a multipath application (such as PowerPath) may be configured to determine a service of a flaky path. In a further embodiment, a service may be configured to initiate a failover mechanism in a cluster. In a further embodiment, a service may be configured to assign an executing application, which may be experiencing a flaky path, to a second node in a cluster. In a further embodiment, a node may include at least one of a host computer or a virtual machine. In yet a further embodiment a virtual machine may include multiple I/O domains of an operating system within a host computer. In a further embodiment, each I/O domain may be treated as a separate operating system to which physical devices may be coupled/connected.

A further embodiment may include a table containing zoning data. In yet a further embodiment, zoning data may include logical paths in a cluster coupling a node to an array. In certain embodiments, a path may include a mapping between a host port, a switch port, and an array port within a cluster.

In a further embodiment, if paths to a node in a cluster are flaky, a trigger may be provided as an indicator for rejecting application I/O in a multipath application. Yet a further embodiment may include a service, which may include sending/transmitting a command to a multipath application (for example PowerPath), which may confirm that paths in a cluster may be flaky. In yet a further embodiment, a service may direct an application I/O to a second host if all paths from a first node may be found flaky in a cluster. An alternate embodiment may include transmitting to a multipath application in a cluster that a node and/or a service in a cluster that all paths from a node are flaky.

In a further embodiment, when I/O of an application fails intermittently on certain paths in a cluster, a multipath application may mark such paths flaky. In a further embodiment, paths marked flaky may be assigned a standby mode. In yet a further embodiment, for a node, when all paths from a first node are marked flaky and are assigned to a standby mode, a next I/O intercepted by a multipath application from a first node may be rejected.

In an exemplary embodiment a node in a cluster may contain two HBA ports. In a further embodiment, two HBA ports may consist of four paths, two paths connecting each HBA port to a target array/LUNs through an array port. In a further embodiment, a node may be referred to as flaky, when all four paths though HBA ports of the node connecting array ports become flaky. In a further embodiment, all paths in a particular zone connecting a node to an array port may be flaky.

Reference is now made to FIG. 1, which illustrates an exemplary architecture of a multipathing deployment in SAN environment 100 in accordance with one embodiment of the present disclosure.

In the embodiment of FIG. 1, SAN environment 100 (cluster) includes host 110, fabric 120 (in one embodiment comprise a plurality of switches or a single switch) and array 130 (which generally comprises logical units or disks, also referred to as a storage.) Host 110 and array 130 include a plurality of devices and for sake of simplicity and only a single device is illustrated. Other elements hardware/software/firmware elements may be present within SAN environment 100, but these have not been illustrated in FIG. 1 for sake of simplicity. Elements disclosed with respect to the exemplary embodiment as illustrated in FIG. 1, should not be construed or be intended to limit the scope of the present disclosure.

Figure 2:
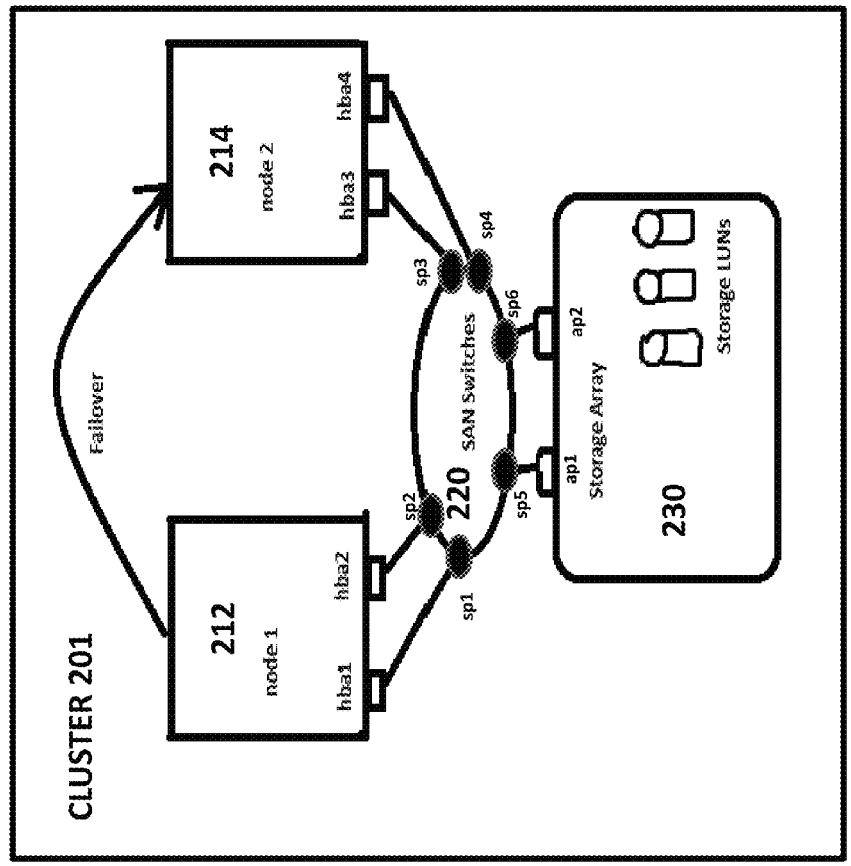
FIG. 2 is an illustration of an exemplary two node cluster failover scenario in accordance with an embodiment of the present disclosure

In the embodiment of FIG. 2, host 110 is configured to run/execute an operating system. Additionally host 110 is configured to also execute a multipath application. In the embodiment of FIG. 1, host 110 includes Host Bus Adapter (HBA) I1 and I2. Each HBA further includes one or more HBA ports. HBA is used to connect host 110 to other devices and/or storage devices in the network, i.e., SAN environment/cluster.

In the embodiment of FIG. 1, in addition to host 110, SAN environment 110 includes fabric 120, which is a logical term for a collection/plurality of physical switches.

In the embodiment of FIG. 1, SAN environment 100 also includes array 130, and array 130 includes a plurality of storages such as a LUN (logical unit number). Each array 130 has an associated array port illustrated as T1 and T2. In the embodiment of FIG. 1, each HBA (I1, I2) is coupled/connected to array port (T1, T2) of array 130 via switch port S of switch 120. Each host bus adapters (I1 and/or I2) of host 110 may be zoned to multiple array ports/director ports (T1 and/or T2) on array 130 (the storage) via fabric 120. A zoning between host 110 and array 130 includes multiple possible paths (shown as solid line arrows and dotted line arrow.) Each connection path from host 110 to array 130 is a combination of various possible paths from host bus adapter (I1 and I2) and array port (T1 and T2).

In the embodiment of FIG. 1, host 110 is coupled/connected to array 130 through switch 120 (a fabric). After zoning is completed for the cluster between HBA (I1 and I2), the host initiation points, and array ports (T1 and T2), in the exemplary embodiment illustrated in FIG. 2, a maximum possibility of (four) 4 connections (paths) from host 110 to array 130 are possible. These paths are $I_1 \rightarrow T_1$, $I_1 \rightarrow T_2$, $I_2 \rightarrow T_1$, $I_2 \rightarrow T_2$, which are illustrated by solid/dotted arrow lines from the host to the array via the switch.

In the exemplary embodiment of FIG. 1, consider path P1 (dotted arrow line) from initiating from host port I1 and terminating at array port T1 via switch 120. Path P1 is considered to be flaky when P1 is able to deliver only some data, whereas path P1 under normal circumstances should deliver data with an unacceptable error rate. In this case it is noted that path P1 from host 110 to switch 120 is sometimes alive or functional and path P1 from switch 120 to array 130 is sometimes dead or nonfunctional, resulting in a path P1 being flaky. Therefore any application executing on host 210 that needs access to array 230, sees path P1 between host 210 and switch 220 in an "alive" or functional state, and the same application is not able to transmit information between switch 120 and array 130, as path P1 is "dead" or nonfunctional, leading to performance related issues in the SAN.

In one embodiment, a fabric may be designed to perform a role of a container for switches. In one embodiment, a fabric may consist of a plurality of switches (physical switches). In a further embodiment, a fabric may be configured to maintain zoning information of a cluster. In an example embodiment illustrating a single node and a single array, a number of paths from the host to the array depend on a number of ports available on a host and a number of ports available on an array. In a further embodiment, a multipath application in a cluster may view possible (multiple) paths to from the host to the array. In a further embodiment, a multipath application may be configured to provide load balancing and failover capability for the LUN.

Reference is now made to FIG. 2, which illustrates an exemplary embodiment of a two node (host) cluster failover scenario 200. The embodiment of FIG. 2 illustrates a two node cluster 201, comprising node 1 212 and node 2 214, that share LUNs 230 (storage/array) via SAN switches 220. The two nodes, node 1 212 and node 2 214, have either the same or different OS architectures and each node has HBAs illustrated as hba1, hba2, hba3 and hba4. Node 1 212 and Node 2 214 are independent machines (may be referred to as nodes or hosts or computers). A multipath application is configured to run on Cluster 210 and services (cluster management application) also run on cluster 201. In the embodiment of FIG. 2 each node has two HBAs. Node 1 212 has HBA ports hba1 and hba2, and Node 2 214 has HBA ports hba3 and hba4. HBA ports hba1 . . . hba4 are coupled to switch 220 on a switch port sp1 . . . sp4. The other end of switch 220 has links to storage array 230 (or simply referred to as array) via switch ports sp5, sp6 to storage array port ap1, ap2 (also referred to as array ports). Storage array 230 is responsible for exposing disks or LUNs to nodes 212, 214, via SAN Switch 220 and HBAs hba1 . . . hba4.

In some embodiments, a cluster may not failover to another other node even in an event of paths to a storage being flaky (not completely dead or partially dead), which may result in a performance degradation in a SAN. In some other embodiments, failovers may occur in an event of complete failure of components in a SAN. In some other embodiments, failover may occur in a situation when nodes are down. In some other embodiments, in an event HBAs/paths through nodes are found to be flaky, I/O of nodes may continue to flow through flaky components resulting, and may result in delay in processing the I/O. In some other embodiments, such flaky paths may impact performance of mission critical applications in a SAN. In one embodiment, a multipath application may be configured to detect flakiness but a cluster service may not be configured to failover a node if all paths to a target (disks or LUNs) are found to be flaky. In one embodiment, to address such situations, when a multipath application detects a flaky path, a multipath application may be configured to intimate/signal to a cluster service about a flaky path. In certain embodiments, on detection of a flaky path, a cluster service may be configured to trigger/activate/initiate a failover mechanism that may result in ensuring seamless operation for an application. In one embodiment, a flaky path may mean/imply that a complete path from a host to an array may not be in a proper/accurate/correct state.

Refer now to the example embodiment of FIG. 1. Path P1 may not be in a proper state of communication between host 110 and array 130. In the embodiment of FIG. 1, when path P1 is considered to be flaky, all I/O passing though path P1 may sometimes succeed and in general fail.

In certain embodiments, a path may be flaky due to an issue with hardware components in a SAN. In other embodiments, due to intermittent I/O failures, a multipath application may retry these I/O with other available paths in a SAN. In one embodiment, on detection of an I/O error on a certain path, a multipath application may be configured to assign a "suspect" state to that path. In another embodiment, a multipath application may have an internal path verification algorithm that may be configured to try and detect health of a path suspected to be flaky. Again, in some other embodiments, due to flakiness of a path, there may be a possibility that a path verification process may not show any problem for a path suspected to be flaky, and a multipath application may bring a flaky path into use as a path verification process may be favorable at that instant of time.

In some embodiments, intermittent I/O failures on a path may result in poor I/O performance. In some other embodiments, in an I/O stream, if I/O failures are found to be continuous over a path, such a path may not be considered as flaky and may be considered to be a dead path by a multipath application. In one embodiment, a flaky path based "autostandby" algorithm may be designed to address any issue of identifying paths that may not be in a proper state. In certain embodiments, for an average number of I/O dispatched on a given path, a multipath application algorithm may keep a count on number of I/O that failed. In one embodiment, once a multipath application detects that a number of errors on a given path may have reached a limit for an average number of I/O, multipath application may move such a path to an "autostandby" state. In some other embodiments, a multipath application may not be configured to pick an "autostandby" path for an I/O as there may be other paths that may be alive and available in a SAN. In one embodiment, in an event where all active paths may be put to an "autostandby" state, I/O may still continue being routed through other available standby paths.

In some embodiments, a multipath application may be configured to return an indication (indicator) to a cluster software/application (services) that paths in a cluster may be flaky. In a further embodiment, when such an indicator may be triggered/identified, a cluster may be configured to better failover resources to other available nodes. In certain embodiments, failover of a node with flaky paths may ensure that performance related problems/issues for critical application with respect to flakiness of paths may not have any impact in a cluster. In certain embodiments, there may be detection of a flaky path. In certain other embodiments there may be a notification of services for which flaky path may be identified. In certain other embodiments, there may be a backing up of resources to other nodes based on an identification of a path being flaky (i.e., to other node in a same cluster that may be different from a node where a flaky path may be detected).

Embodiments of the present disclosure may be configured to notify a cluster service that paths to resources (disks or LUNs) in a SAN may be flaky. In one embodiment, for improving performance in a cluster by avoiding any further outages, for example once the hardware becomes completely faulty, a cluster service may allow failover of resources (failed resource) to another node (or host or computer or machine) in the cluster. In a further embodiment a cluster service may provide access to data through a new node (or host or computer or machine) that may have a different setup of hardware paths so that an application may run/execute seamlessly and performance of the application may not be impacted.

In one embodiment, a multipath application may be configured to return an I/O failure in case paths in a cluster may be found to be flaky. In a further embodiment, if all active paths to target devices (or LUNs) in a cluster may be found to be flaky, a multipath application in the cluster may be configured to return an I/O error from multipath layers itself. In one embodiment, a cluster service may send a command/instruction to a multipath application to check if paths are flaky in a cluster. In a further embodiment, on determination of paths being flaky in a cluster, a cluster service may initiate a failover to another node in the cluster such that an application may be configured to have continued access to resources through healthy paths via other nodes in the cluster.

Figure 3:
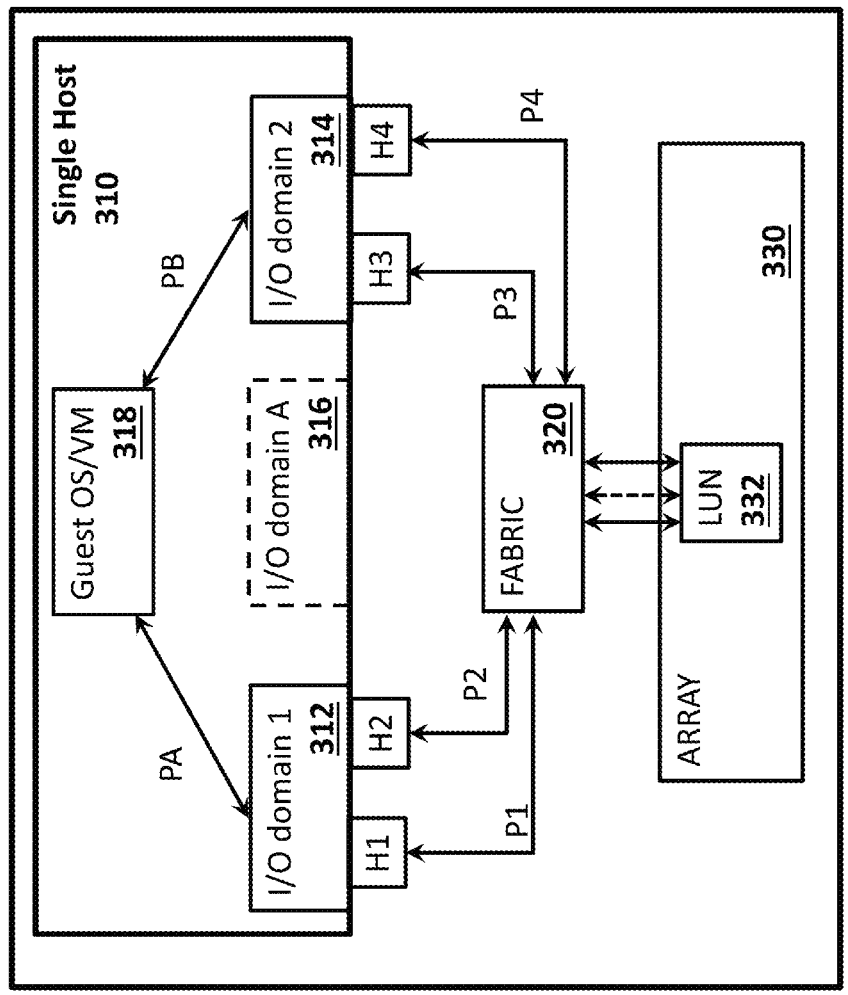
FIG. 3 is an exemplary illustration of a failover scenario in a single host (node) having multiple virtual machines in accordance with an embodiment of the present disclosure.

Reference is now made to FIG. 3, which illustrates an exemplary embodiment of a failover mechanism in single host 300 comprising a plurality of VMs. In the embodiment of FIG. 3, host 310 has a plurality of VMs, illustrated as I/O Domain 1 312, I/O Domain 2 314, I/O Domain A 316 and Guest VM 318. The I/O domains in FIG. 3 may be compared to the nodes illustrated in FIG. 2. In the embodiment of FIG. 3, operating system of host 310 has I/O domain 1 312, I/O domain 2 314, I/O domain A 316, which are coupled to physical devices of the cluster. Guest VM 318 has access to the other virtual devices namely I/O domain 1 312, I/O domain 2 314, I/O domain A 316. Guest VM 318 does not have access to physical devices of host 300. In the embodiment of FIG. 3, there are four HBAs connected to this host, I/O domain 1 having HBAs, H1 and H2, and I/O domain 2 having HBAs H3 and H4, which are coupled to fabric 320. Fabric 320 in turn is coupled to Array 330 via array ports (not shown in Figure). Array 330 array comprises a plurality of LUNs 332. FIG. 3 illustrates a scenario wherein redundancy is created in the I/O domain, by having two I/O domains having separate set of hardware components (drawing comparison with respect to FIG. 2, each of the I/O domains may be considered as separate node).

In the embodiment of FIG. 3, I/O domain 312 and I/O domain 2 314 are configured to act as two separate hosts (within a single box), and each I/O domain is connected with 2 HBAs. Therefore, if there is a LUN connected to host 310, and has one path going through each HBA to the LUN, there will be in all four paths (P1, P2, P3 and P4). Two paths (P1 and P2) will go to I/O domain 1 and the other two paths (P3 and P4) will go to the I/O domain 2, as illustrated in FIG. 3. Both the I/O domains 312, 314 are configured to export the same LUN to guest domain (guest VM) 318. Therefore, Guest Domain 318 will see two different paths to the same device (LUN), one path (PA) through I/O domain 1 and another path (PB) through I/O domain 2, as illustrated by a solid arrow line connecting Guest VM 318 and the respective I/O Domains 312, 314.

In some embodiments, a number of possible paths may exist between an array and a host. In certain embodiments, an I/O domain may mean an operating system may have access to physical hardware connected to a host. In other embodiments, a Guest VM may mean an operating system where I/O domains may export one or more hardware components such as HBA or LUNs. In certain embodiments, there may be more than two I/O domains In certain embodiments, using virtualization technology (similar to the cluster service application as discussed in FIG. 2) two paths may be grouped into a single group (i.e. multiple paths being grouped into the same group). In some embodiments, two paths and I/O from a guest VM may be routed through a first I/O domain or a second I/O domain. In some embodiments, if there is a failure in a first I/O domain, then I/O may automatically be routed to a second I/O domain.

In some embodiments, if paths through one I/O domain are flaky due to a faulty HBA or any other hardware component in a path between a LUN and a HBA, then a multipath application may mark such paths as flaky. In certain embodiments, if paths to a node are marked as flaky, further I/O coming down a path identified as flaky may be rejected by a multipath application. In most embodiments, allowing a virtual environment to failover application I/O to another domain based on identification of flaky paths may provide seamless access to a disk (or LUN) through a different set of hardware components. In most embodiments, a tunable parameter in a multipath application may be set to return an indicator (by rejecting I/O) if paths are flaky. In one embodiment, once paths are determined to be flaky, services may direct application I/O to another node in a cluster by making this new node as an owner of the resources (LUNs).

In some embodiments, due to flakiness, I/O may fail intermittently on paths, a multipath application may mark these paths as flaky and may put such paths into a "auto-standby" mode. In certain embodiments, if paths of a node are marked as flaky, a next I/O intercepted by a multipath application may be rejected because paths are marked as flaky. In many embodiments, a cluster service may send/transmit a command to a multipath driver to check if paths may be flaky. In one embodiment, a cluster service may failover from one node to another node in a cluster, and may assign resources to the other node. In a further embodiment, a system administrator may be provided with a log, such as in system logs, indicating that multipath layers rejected an I/O because all paths were flaky. In a further embodiment, such an indication to a system administrator may help an administrator to replace flaky FC cables or investigate hardware components on those paths.

Figure 4:
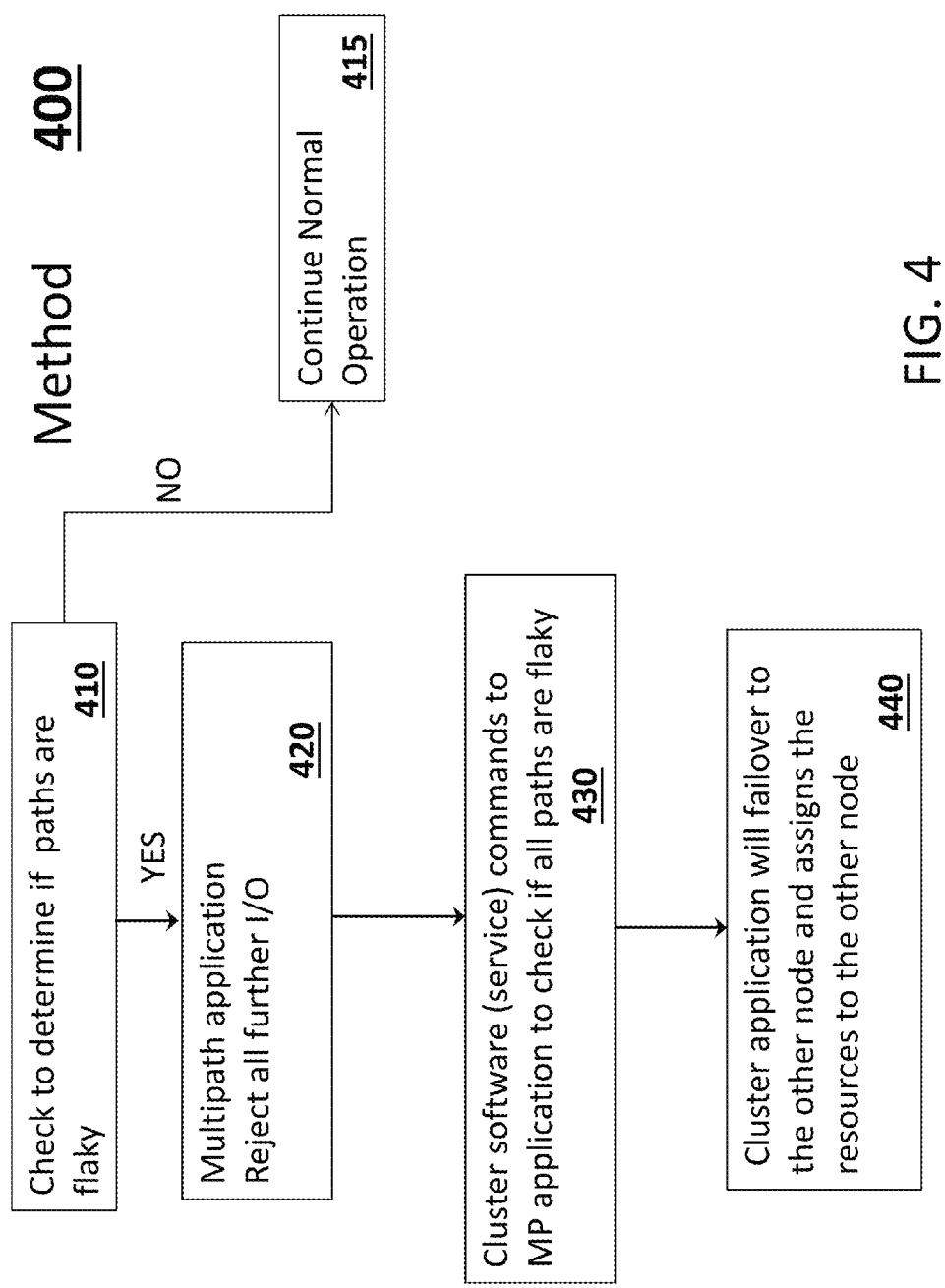
FIG. 4 is a simplified block diagram illustrating an exemplary method for performing failover in a cluster environment in accordance with an embodiment of the present disclosure.

Reference is now made to FIG. 4 that illustrates a method 400 for a multipath software/application configured to have flaky path support, such that an application is configured to return an indication (Indicator) to cluster software (services) that all paths are flaky. In the embodiment of FIG. 4, the cluster may be better configured to handle failover of resources to other nodes to ensure critical application are not affected due to performance problem such as paths being flaky.

In Step 510, in a cluster based environment identify or determine a trigger that all paths are flaky which is provided by setting a tunable parameter in a multipath application. Once paths are determined to be flaky in step 510, in step 520 all further I/O arising from a current resource owning node or a current I/O Domain (current VM) is rejected by the multipath application. In step 530 cluster services sends a command to the multipath application to check if all paths are flaky, and if all paths are found to be flaky in the cluster the multipath application will return an indicator that all paths flaky. Next in Step 540 cluster services will failover to another node within the cluster and assigns resources to the other nodes. In the embodiment of FIG. 4, an application runs seamlessly and there is no performance impact.

Figure 5:
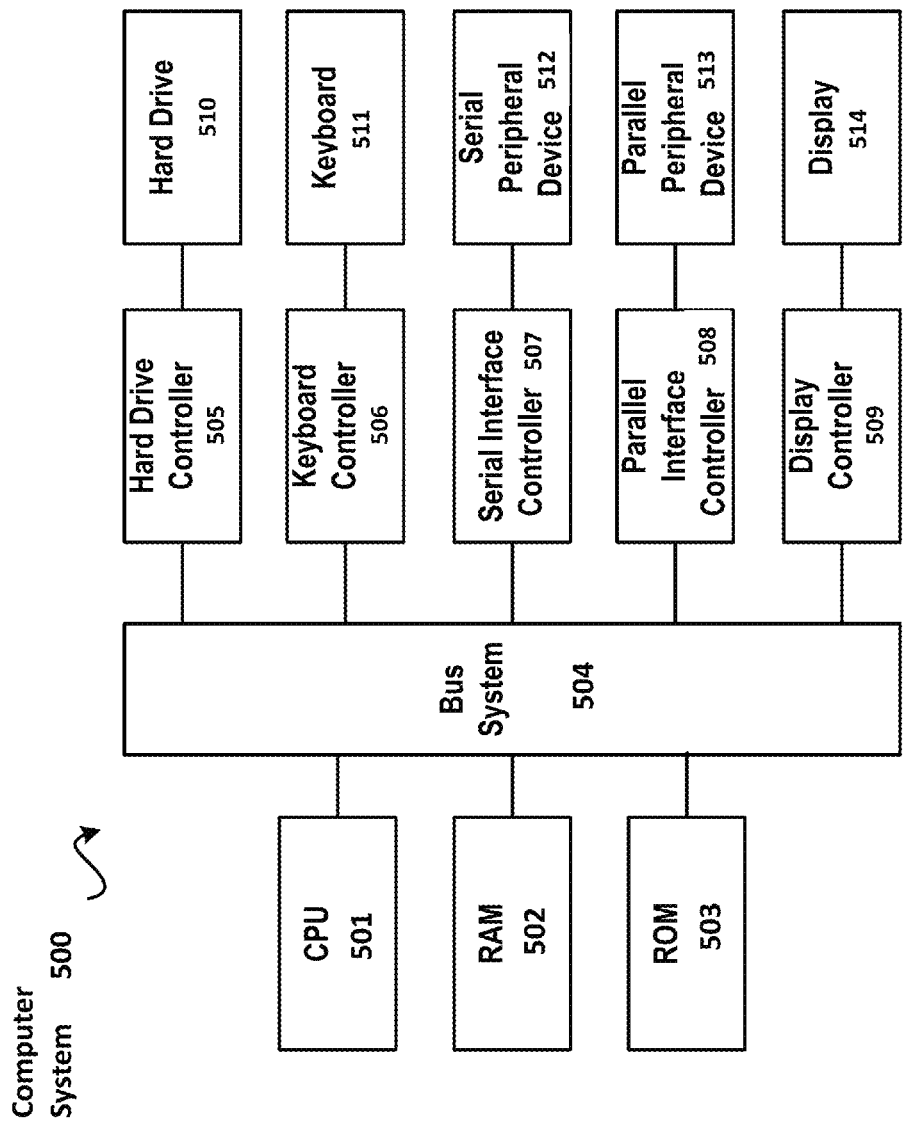
FIG. 5 schematically illustrates a block diagram of an exemplary computer system in accordance with an embodiment of present disclosure.

Reference is now made to the example embodiment of FIG. 5, which illustrates an exemplary computer system 500 in accordance with an embodiment of the present disclosure. As illustrated in FIG. 5, the computer system 500 includes: CPU (Central Process Unit) 501, RAM (Random Access Memory) 052, ROM (Read Only Memory) 503, System Bus 504, Hard Drive Controller 505, Keyboard Controller 506, Serial Interface Controller 507, Parallel Interface Controller 508, Display Controller 509, Hard Drive 510, Keyboard 511, Serial Peripheral Equipment 512, Parallel Peripheral Equipment 513 and Display 514. Among above devices, CPU 501, RAM 502, ROM 503, Hard Drive Controller 505, Keyboard Controller 506, Serial Interface Controller 507, Parallel Interface Controller 508 and Display Controller 509 are coupled to the System Bus 504. Hard Drive 510 is coupled to Hard Drive Controller 505. Keyboard 511 is coupled to Keyboard Controller 506. Serial Peripheral Equipment 512 is coupled to Serial Interface Controller 507. Parallel Peripheral Equipment 513 is coupled to Parallel Interface Controller 508. And, Display 514 is coupled to Display Controller 509.

Exemplary computer system 500 is discussed only for illustrative purpose and should not be construed as a limitation on the embodiments or scope of the present disclosure. In some cases, some devices may be added to or removed from computer system 500 based on specific situations. For example, computer system 500 may be a representative of a host computer (node) or may be part of a fabric or may be part of an array, and a multipath application (for example PowerPath) may reside on one of the host side performing multipath operation coupling the hosts with the fabric and the array. In most embodiments, a system/device may comprise a processor and a memory, such as a laptop computer, personal digital assistant, or mobile phones.

Refer now to the example embodiment wherein methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. In a further embodiment, when a program code is loaded into and executed by a machine, the machine becomes an apparatus for practicing the disclosure. In a further embodiment, when implemented on one or more general-purpose processors, a program code combines with such a processor to provide a unique apparatus that operates analogously to specific logic circuits. In a further embodiment, as such a general purpose digital machine may be transformed into a special purpose digital machine. In a further embodiment, a processor may be a physical processor or a virtual processor. In certain embodiments, a virtual processor may correspond to one or more or parts of one or more physical processors.

Figure 6:
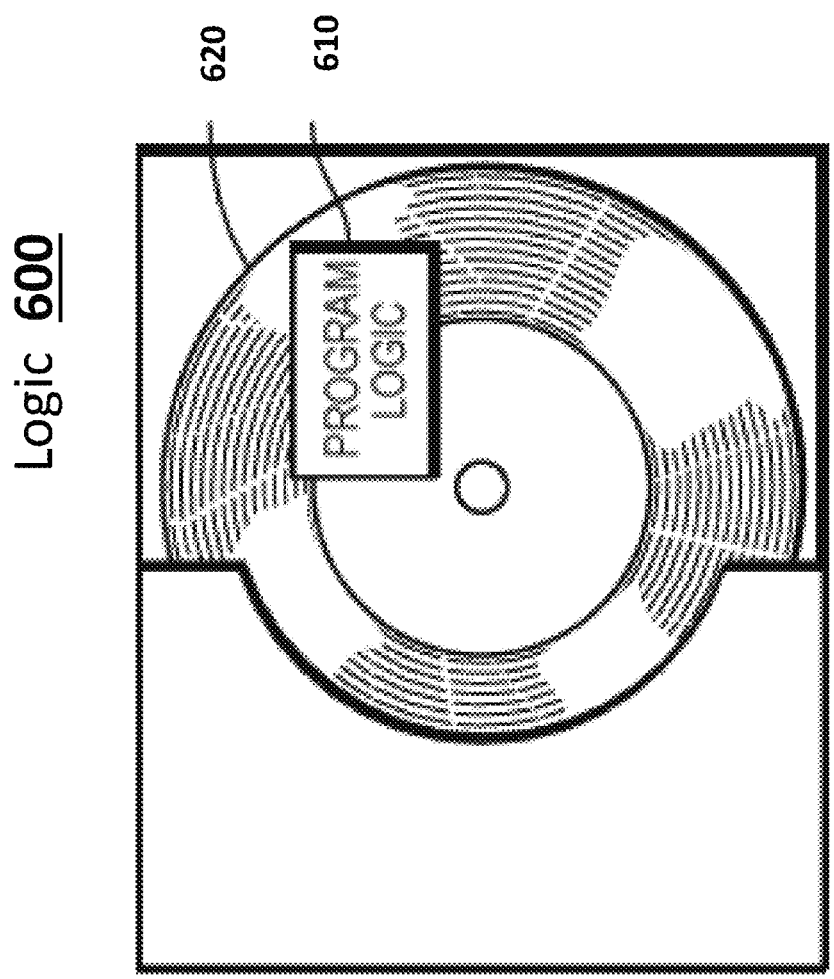
FIG. 6 is a diagram illustrating an example embodiment method of the present disclosure embodied as program code or a program product in accordance with an embodiment of the present disclosure.

Reference is now made to FIG. 6 that shows an exemplary embodiment of program logic 620 embodied on a computer-readable medium 610 as shown, and wherein the logic 620 is encoded in computer-executable code configured for carrying out the gas controlling process of this invention, thereby forming a computer program product 600.

The logic for carrying out the method may be embodied as part of the aforementioned system, which is useful for carrying out a method described with reference to embodiments shown in, for example, FIG. 2, FIG. 3 and FIG. 4. For purposes of illustrating the present disclosure, the disclosure is described as embodied in a specific configuration and using special logical arrangements, but one skilled in the art will appreciate that the device is not limited to the specific configuration but rather only by the claims included with this specification.

The scope of the disclosure is not limited only by the claims and the disclosure may encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method for managing performance of application I/O in a cluster, the method comprising:
   monitoring application I/O on paths in the cluster, and on detection of the application I/O failing intermittently on the paths in the cluster, marking the paths in the cluster detected as flaky;
   determining whether paths from a first host to a node in the cluster are flaky;
   assigning the paths in the cluster marked flaky to a standby mode; and
   on detection of a path of the paths being flaky from the node, initiating a failover mechanism for an application I/O from the node to a second node in the cluster to transmit the application I/O in the cluster using zoning information in the cluster.

2. The method of claim 1, wherein a multipath application in the cluster notifies a service application of the detection of the path of the paths being flaky, and the service application initiate the failover mechanism.

3. The method of claim 2, further comprising:
   sending a command from the service application to the multipath application confirming all paths are flaky.

4. The method of claim 1, wherein the service application assigns I/O of an executing application to the second host.

5. The method of claim 1, wherein the host comprises a host computer or a virtual machine.

6. The method of claim 1, wherein zoning information comprises a path between the host and an array, the path comprises a mapping between a host port, a switch port and an array port in the cluster.

7. The method of claim 1, further comprising:
   rejecting application I/O by the multipath application if the paths in the cluster are flaky.

8. The method of claim 1, wherein when the paths marked flaky are assigned to the standby mode, a next application I/O intercepted by the multipath application is rejected for the paths marked flaky.

9. The method of claim 1 wherein when active paths are put in an autostandby state indicating that a number of errors on a given path may have reached a limit for an average number of I/O, I/O may still continue being routed through other available standby paths.

10. A non-transient computer readable storage medium having computer program instructions stored therein, the computer program instructions, enabling execution across one or more processors of:
    monitoring application I/O on paths in the cluster, and on detection of the application I/O failing intermittently on the paths in the cluster, marking the paths in the cluster detected as flaky;
    determining whether paths from a first host to a node in the cluster are flaky;
    assigning the paths in the cluster marked flaky to a standby mode; and
    on detection of a path of the paths being flaky from the node, initiating a failover mechanism for an application I/O from the node to a second node in the cluster to transmit the application I/O in the cluster using zoning information in the cluster.

11. The computer readable storage medium of claim 10, wherein the instruction enables a multipath application in the cluster notifies a service application of the detection of the path of the paths being flaky, and the service application initiate the failover mechanism.

12. The computer readable storage medium of claim 11, wherein the instructions further enable: sending a command to the multipath application confirming all paths are flaky from the service application.

13. The computer readable storage medium of claim 10, wherein the service application assigns I/O of an executing application to the second host.

14. The computer readable storage medium of claim 10, wherein the host comprises a host computer or a virtual machine.

15. The computer readable storage medium of claim 10, wherein zoning information comprises a path between the host and an array, the path comprises a mapping between a host port, a switch port and an array port in the cluster.

16. The computer readable storage medium of claim 10, the instructions further enable rejecting application I/O by the multipath application if the paths in the cluster are flaky.

17. The computer readable storage medium of claim 10, wherein when the paths marked flaky are assigned to the standby mode, a next application I/O intercepted by the multipath application will reject the application I/O for the paths marked flaky.

18. The computer readable storage medium of claim 10, the instructions further enabling wherein when active paths are put in an autostandby state indicating that a number of errors on a given path may have reached a limit for an average number of I/O, I/O may still continue being routed through other available standby paths.

19. A system configured to perform managing performance of an application I/O comprising:
    a host,
    a fabric,
    an array, and computer executable logic enabling execution across one or more processors of:
determining whether paths from a first host to a node in a cluster are flaky; and
on detection of a path being flaky from the node, initiating a failover mechanism for an application I/O from the node to a second node in the cluster to transmit the application I/O in the cluster using zoning information in the cluster;
monitoring application I/O on paths in the cluster, and on detection of the application I/O failing intermittently on the paths in the cluster, marking the paths in the cluster detected as flaky;
assigning the in the cluster marked flaky to a standby mode;
wherein a multipath application in the cluster notifies a service application of the detection of paths being flaky, and the service application initiates the failover mechanism, wherein the service application assigns executing application I/O to the second host, the host including a host computer or a virtual machine; and
wherein zoning information comprises a path between the host and the array, the path comprising a mapping between a host port, a switch port and an array port in the cluster.

20. The system as claimed in claim 19, wherein the logic further enables;
rejecting application I/O by the multipath application if all the paths in the cluster are flaky, wherein the service application sending a command to the multipath application confirming all paths are flaky.

21. The system as claimed in claim 19, wherein the logic further enables:
monitoring the application I/O on the paths in the cluster, and on detection of the application I/O failing intermittently on the paths in the cluster, marking these paths as flaky;
assigning the paths marked flaky to a standby mode; and
wherein when the paths marked flaky are assigned to the standby mode, a next application I/O intercepted by the multipath application will reject the application I/O for the paths marked flaky.

* * * * *

UNITED STATES PATENT AND TRADEMARK OFFICE
CERTIFICATE OF CORRECTION

| | |
|---|---|
| PATENT NO. | : 9,996,437 B2 |
| APPLICATION NO. | : 15/084559 |
| DATED | : June 12, 2018 |
| INVENTOR(S) | : Prashant Kulli and Praveen Satya |

Page 1 of 1

It is certified that error appears in the above-identified patent and that said Letters Patent is hereby corrected as shown below:

On the Title Page

Add:
(30) Foreign Application Priority Data
Mar. 31, 2015 (IN) .......................... 1695/CHE/2010

Signed and Sealed this
Thirteenth Day of November, 2018

Andrei Iancu
*Director of the United States Patent and Trademark Office*